United States Patent Office 3,408,200
Patented Oct. 29, 1968

3,408,200
PRODUCTION OF ANIMAL FEED CONTAINING GAMMA AMINO BUTYRIC ACID AND THE RESULTING PRODUCT
Robert Teichman, Kirkwood, and James Peek Everett, Jr., St. Louis, Mo., assignors to Ralston Purina Company, St. Louis, Mo., a corporation of Missouri
No Drawing. Filed May 28, 1964, Ser. No. 371,080
3 Claims. (Cl. 99—2)

ABSTRACT OF THE DISCLOSURE

An appetite-depressing animal feed product comprising animal feed containing not less than about 0.68% by weight of added gamma amino butyric acid.

---

This invention relates to animal feeds and more particularly to such feeds which contain an appetite depressant.

Briefly, the present invention provides an animal feed containing gamma amino butyric acid which decreases the voluntary feed intake of animals.

Among the objects of the invention are the provision of animal feeds which will depress voluntary feed intake; the provision of methods of altering the voluntary feed intake of animals by means of the feed provided for the animals; the provision of methods of preparing a feed of the type indicated; and the provision of methods of selectively altering the voluntary feed intake of animals for predetermined periods without affecting the animals or their subsequent voluntary feed intake. Other objects and features will be in part apparent and in part pointed out hereinafter.

The invention accordingly comprises the products and methods hereinafter described, the scope of the invention being indicated in the following claims.

While for many purposes the grower of animals wishes to have the feed offered to the animals accepted to the maximum useful extent, and the growth of the animals to proceed at the maximum rate, this is not always the case. For certain purposes it is desired to restrict the voluntary feed intake of animals to achieve particular results, yet it is desired to do this without harm to the animals and while maintaining adequate nutrition. With previously known feeds and methods, this has been difficult and has frequently not been achieved, at least to the desired extent.

According to the present invention, animal feeds are provided which afford adequate nutrition for animals, which may be effectively utilized by the animals for growth and production purposes and yet which decrease the rate of voluntary feed intake. Although otherwise conventional in components, the feeds of the present invention contain as an essential ingredient a comparatively small proportion of gamma amino butyric acid. It has been found that in proportions as small as 0.68% by weight of the other feed components, gamma amino butyric acid present in the feed will accomplish the foregoing results, will restrict the rate of intake of the feed and this will be accomplished without harm to the animals.

Furthermore, it has been found that after the use of the animal feeds of the present invention for a predetermined period of time, replacement of these feeds with conventional animal feeds will result in subsequent voluntary feed intake at a substantially normal rate. In other words, withdrawal of the feeds of the present invention will not result in a latent or delayed effect on the animals. The only apparent result of the use of the feeds of the present invention is the reduction in voluntary consumption of feed during the time that the feeds of the present invention are employed.

Increase in the proportion of gamma amino butyric acid above 0.68% by weight of the other feed components will result in a substantially linear reduction of voluntary feed consumption.

Comparative test results indicate that the reduction in feed consumption is of the order of up to 15% as compared with the feed consumption of animals fed with conventional feeds.

The following examples illustrate the invention:

Example 1

Two groups of thirty two-week old broiler-type chicks were fed under controlled conditions with a standard broiler-starting feed for three weeks and then with a standard finisher feed for the following five weeks. One group functioned as the control group and was fed the foregoing feeds in the customary manner. The other group was offered the same feeds but into which was incorporated 0.68% by weight of gamma amino butyric acid. The results secured were as follows:

|  | Control, g. | Gamma Amino Butyric Acid, g. |
|---|---|---|
| Initial Liveweight | 256 | 245 |
| Final Liveweight [1] | 1,527 | 1,453 |
| Liveweight Gain | 1,278 | 1,176 |
| Feed Consumption [1] | 2,822 | 2,785 |
| Gamma Amino Butyric Acid Consumption [1] | 0 | 18.55 |

[1] Adjusted by covariance for Initial Liveweight.

Example 2

Example 1 was repeated but the feeds of the present invention tested contained 1.36% by weight of gamma amino butyric acid rather than the 0.68% by weight of the feeds as used in Example 1. The results secured were as follows:

|  | Control, g. | Gamma Amino Butyric Acid, g. |
|---|---|---|
| Initial Liveweight | 256 | 254 |
| Final Liveweight [1] | 1,527 | 1,425 |
| Liveweight Gain | 1,278 | 1,171 |
| Feed Consumption [1] | 2,822 | 2,691 |
| Gamma Amino Butyric Acid Consumption [1] | 0 | 36.60 |

[1] Adjusted by covariance for Initial Liveweight.

Example 3

Example 1 was repeated but the feeds of the present invention tested contained 2.04% by weight of gamma amino butyric acid rather than the 0.68% by weight of the feeds as used in Example 1. The results secured were as follows:

|  | Control, g. | Gamma Amino Butyric Acid, g. |
|---|---|---|
| Initial Liveweight | 256 | 248 |
| Final Liveweight [1] | 1,527 | 1,362 |
| Liveweight Gain | 1,278 | 1,094 |
| Feed Consumption [1] | 2,822 | 2,634 |
| Gamma Amino Butyric Acid Consumption [1] | 0 | 53.00 |

[1] Adjusted by covariance for Initial Liveweight.

Example 4

Example 1 was repeated but the feeds of the present invention tested contained 2.72% by weight of gamma amino butyric acid rather than the 0.68% by weight of the feeds as used in Example 1. The results secured were as follows:

|  | Control, g. | Gamma Amino Butyric Acid, g. |
|---|---|---|
| Initial Liveweight | 256 | 264 |
| Final Liveweight [1] | 1,527 | 1,350 |
| Liveweight Gain | 1,278 | 1,120 |
| Feed Consumption [1] | 2,822 | 2,742 |
| Gamma Amino Butyric Acid Consumption [1] | 0 | 76.23 |

[1] Adjusted by covariance for Initial Liveweight.

Example 5

Example 1 was repeated but the feeds of the present invention tested contained 3.40% by weight of gamma amino butyric acid rather than the 0.68% by weight of the feeds as used in Example 1. The results secured were as follows:

|  | Control, g. | Gamma Amino Butyric Acid, g. |
|---|---|---|
| Initial Liveweight | 256 | 260 |
| Final Liveweight [1] | 1,527 | 1,305 |
| Liveweight Gain | 1,278 | 1,065 |
| Feed Consumption [1] | 2,822 | 2,629 |
| Gamma Amino Butyric Acid Consumption [1] | 0 | 90.62 |

[1] Adjusted by covariance for Initial Liveweight.

Example 6

The test groups of Example 1, after the test period, were both fed for three additional weeks with the standard broiler-finisher feed which did not contain any gamma amino butyric acid. The results secured were as follows:

|  | Control, g. | Test Group, g. |
|---|---|---|
| Initial Liveweight | 1,527 | 1,453 |
| Final Liveweight [1] | 2,287 | 2,266 |
| Liveweight Gain [1] | 882 | 861 |
| Feed Consumption [1] | 2,307 | 2,461 |

[1] Adjusted by covariance for Initial Liveweight.

Example 7

The test groups of Example 2, after the test period, were both fed for three additional weeks with the standard broiler-finisher feed which did not contain any gamma amino butyric acid. The results secured were as follows:

|  | Control, g. | Test Group, g. |
|---|---|---|
| Initial Liveweight | 1,527 | 1,425 |
| Final Liveweight [1] | 2,287 | 2,339 |
| Liveweight Gain [1] | 882 | 929 |
| Feed Consumption [1] | 2,307 | 2,438 |

[1] Adjusted by covariance for Initia Liveweight.

Example 8

The test groups of Example 3, after the test period, were both fed for three additional weeks with the standard broiler-finisher feed which did not contain any gamma amino butyric acid. The results secured were as follows:

|  | Control, g. | Test Group, g. |
|---|---|---|
| Initial Liveweight | 1,527 | 1,362 |
| Final Liveweight [1] | 2,287 | 2,192 |
| Liveweight Gain [1] | 882 | 799 |
| Feed Consumption [1] | 2,307 | 2,376 |

[1] Adjusted by covariance for Initial Liveweight.

Example 9

The test groups of Example 4, after the test period, were both fed for three additional weeks with the standard broiler-finisher feed which did not contain any gamma amino butyric acid. The results secured were as follows:

|  | Control, g. | Test Group, g. |
|---|---|---|
| Initial Liveweight | 1,527 | 1,350 |
| Final Liveweight [1] | 2,287 | 2,355 |
| Liveweight Gain [1] | 882 | 950 |
| Feed Consumption [1] | 2,307 | 2,506 |

[1] Adjusted by covariance for Initial Liveweight.

Example 10

The test groups of Example 5, after the test period, were both fed for three additional weeks with the standard broiler-finisher feed which did not contain any gamma amino butyric acid. The results secured were as follows:

|  | Control, g. | Test Group, g. |
|---|---|---|
| Initial Liveweight | 1,527 | 1,305 |
| Final Liveweight [1] | 2,287 | 2,367 |
| Liveweight Gain [1] | 882 | 962 |
| Feed Consumption [1] | 2,307 | 2,552 |

[1] Adjusted by covariance for Initial Liveweight.

Example 11

Two heifer calves, each three and one-half months of age, were fed under controlled conditions to test the feeds of the present invention. These calves were first fed for a seven-day adjustment period on a basal calf feed containing 16% crude protein. The calves were then fed for a subsequent seven-day preliminary period with the same feed. At the end of this time both animals were then switched to a calf feed identical in all respects to the basal but containing 5% by weight of gamma amino butyric acid. The calves were fed for a five-day period on this ration containing gamma amino butyric acid and were then switched back to the initial basal ration for a seven-day post-experimental period. Water was offered free choice but no other feed was offered at any time during the twenty-six-day period. The results were as follows:

|  | Average Daily Feed Consumption (Pounds) | | | | | |
|---|---|---|---|---|---|---|
|  | First Calf | | Second Calf | | Average | |
|  | Percent Gama Amino Butyric Acid | | | | | |
|  | 0.0 | 5.0 | 0.0 | 5.0 | 0.0 | 5.0 |
| Pre-experimental (I) | 9.7 |  | 10.3 |  | 10.0 |  |
| Experimental (II) |  | 9.4 |  | 9.5 |  | 9.4 |
| Post-experimental (III) | 10.9 |  | 11.2 |  | 11.0 |  |
| Difference I+III−(2×II) | +1.8 |  | +2.5 |  | +2.15 |  |
| Liveweight | 317 |  | 340 |  | — |  |

In the foregoing examples although a reduction in voluntary feed consumption was secured by the utilization of the feeds of the present invention, there was apparently no adaptation to the feed so that when the feed was removed and replaced with a standard feed, the animals resumed their normal rate of feed consumption. No deleterious effects were noted on the animals involved. Accordingly the feeds of the present invention make possible a reduction in voluntary feed intake and in weight gain of the order of up to 15% during the time that the feeds are utilized without impairing subsequent voluntary feed intake and growth after the feeds of the present invention have been replaced by standard feeds.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. An animal feed containing as an added essential ingredient not less than about 0.68% by weight of gamma amino butyric acid based upon the weight of the other feed components.

2. The method of preparing a feed for animals which comprises mixing with the feed components not less than about 0.68% by weight of gamma amino butyric acid, said percentage being based upon the weight of the other feed components.

3. The method of controlling the feed intake of animals comprising feeding to said animals, feeds which contain as an added essential ingredient not less than about 0.68% gamma amino butyric acid, said essential ingredient being by weight of the total feed.

References Cited

Seiden, Feedstuffs, Springer Publishing Co., Inc., New York, 1957, pages 6–12 and 228–230.

Chemical Abstracts: vol. 58, 1963, p. 8236g; vol. 46, 1952, p. 11501c; vol. 55, 1961, p. 3810d; vol. 51, 1957, p. 746b.

RAYMOND N. JONES, *Primary Examiner.*

H. H. KLARE, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,408,200                          October 29, 1968

Robert Teichman et al.

It is certified that error appears in the above identified patent and that said Letters Patent are hereby corrected as shown below:

Column 3, line 55, "Initia" should read -- Initial --. Column 4, line 52, "(ZXII) should read -- (2XII) --.

Signed and sealed this 3rd day of March 1970.

(SEAL)
Attest:

Edward M. Fletcher, Jr.
Attesting Officer

WILLIAM E. SCHUYLER, JR.
Commissioner of Patents